United States Patent [19]

Lee et al.

[11] 3,818,496

[45] June 18, 1974

[54] ILLUMINATION CONTROL SYSTEM

[75] Inventors: Barry T. Lee, Los Angeles; Gunther W. Wimmer, Saugus; Gilbert P. Hyatt, Los Angeles, all of Calif.

[73] Assignee: Micro Computer, Inc., Van Nuys, Calif. ; by said Lee and Wimmer

[22] Filed: Jan. 30, 1973

[21] Appl. No.: 327,918

Related U.S. Application Data

[62] Division of Ser. No. 152,105, June 11, 1971, Pat. No. 3,738,242.

[52] U.S. Cl. ................ 354/75, 355/67, 235/151 PL

[51] Int. Cl. ....................... G03b 29/00, G03b 27/76

[58] Field of Search ............... 95/12, 1; 235/151 PL; 355/67, 68, 69

[56] References Cited

UNITED STATES PATENTS

| | | | |
|---|---|---|---|
| 3,323,414 | 6/1967 | Ritchie et al. | 95/12 |
| 3,330,182 | 7/1967 | Gerber et al. | 95/1 R |
| 3,458,253 | 7/1969 | Hansen | 95/12 UX |
| 3,565,524 | 2/1971 | Pabst et al. | 355/67 X |

*Primary Examiner*—Robert P. Greiner

[57] ABSTRACT

A control system is provided for precisely controlling an illumination source which forms part of system. The control system enables the illumination source to be controlled in accordance with the characteristics of the recording medium, the relative motion between the recording medium and the illumination source, the image to be formed on the recording medium, the dynamics of the system causing the relative motion between the source and the recording medium, variations in the illumination source and over their life, and the illumination source dynamics.

13 Claims, 1 Drawing Figure

PATENTED JUN 18 1974 3,818,496
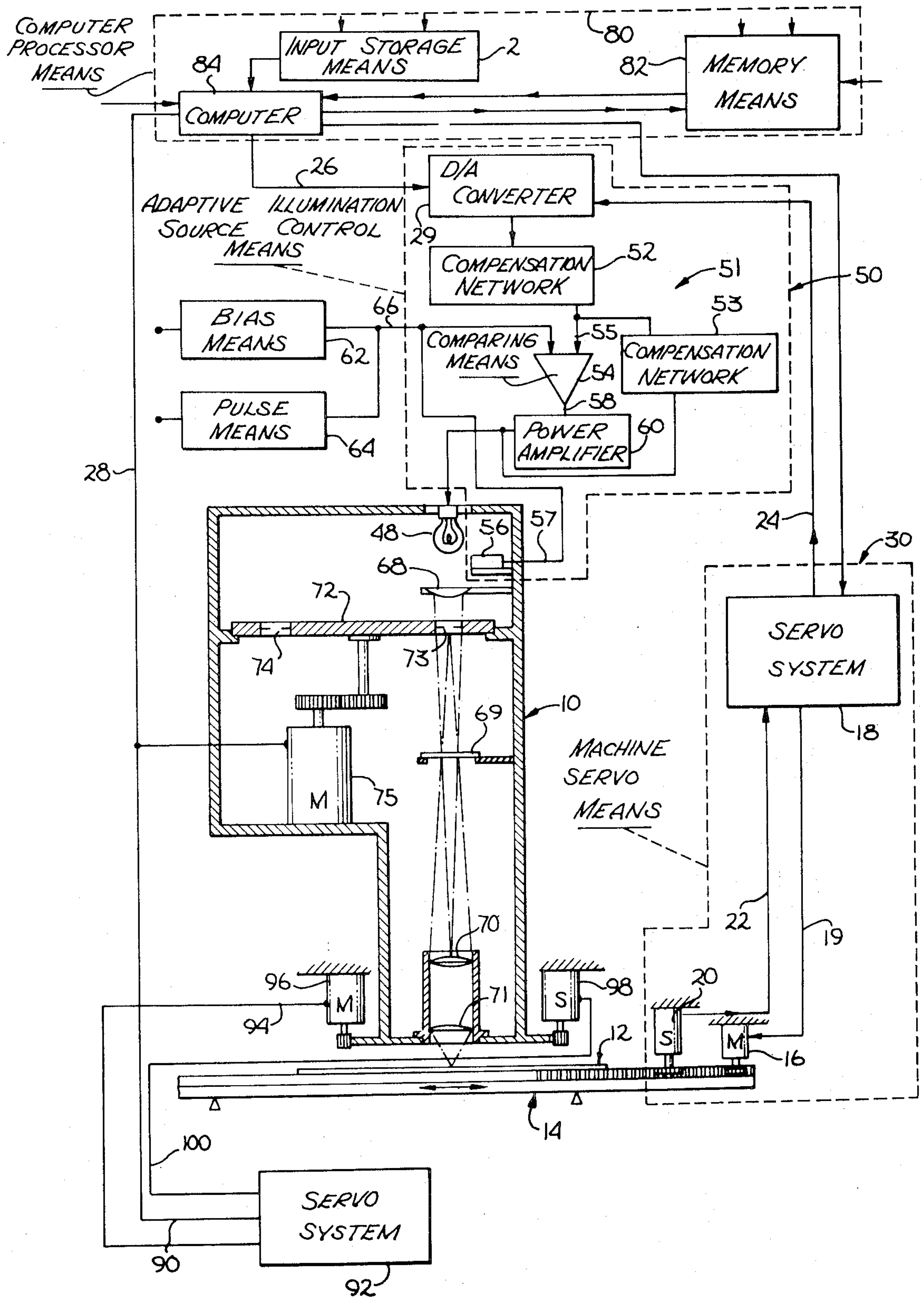

ILLUMINATION CONTROL SYSTEM

REFERENCE TO RELATED APPLICATIONS

This application is a division of application ADAPTIVE ILLUMINATION SOURCE INTENSITY CONTROL DEVICE Ser. No. 152,105 filed on June 11, 1971 and now U.S. Pat. No. 3,738,242 issued on June 12, 1973 by Lee, Wimmer, and Hyatt. This application is further related to copending applications CONTROL APPARATUS Ser. No. 135,040 filed on Apr. 19, 1971 by Gilbert P. Hyatt and application ADAPTIVE ILLUMINATION CONTROL DEVICE Ser. No. 325,792 filed on Jan. 22, 1973 by Lee, Wimmer, and Hyatt wherein these applications are copending applications and are incorporated herein by reference.

BACKGROUND OF THE INVENTION

1. Field of the Invention

The field of the invention is the electronic control of illumination sources.

2. Prior Art

At the outset, it should be understood that the control hereinafter discussed will, in certain instances, be discussed in connection with photo-optical drafting machines. Any reference to photo-optical drafting machines is intended to include any machine wherein relative motion is created between an illumination source and a recording medium for the purpose of converting a non-visual signal representation to a visual or physical representation on the recording media. The particular system discussed hereinafter is one class of such devices.

Photo-optical drafting machines or plotters generally employ a writing head such as an optical head including an illumination source mounted for relative motion with respect to a machanical table that carries a photographic material which is in the nature of a photographic film. A pair of motors (DC control motors or pulse motors) or other actuating devices drive the table in X and Y coordinates via a motion combining mechanism to obtain a resultant relative movement between the photographic material and the optical head. Alternatively, the optical head rather than being fixed is moved in one axis over the photographic material while the table is moved in the other axis. Such a device is shown in U.S. Pat. No. 3,330,182 issued on July 11, 1967. The device shown in the aforementioned patent is typical of prior art devices wherein the photographic material is mounted on an XY table under an optical head.

The optical head in such drafting machines forms an illuminated image, which may be selected from one of several slides or apertures mounted in the optical head, on the film material as the film material and optical head are relatively moved. The illuminated image exposes the film to form the lines and patterns required. When the film is developed, it may be used in such photo-chemical processes as is required in printed circuit and integrated circuit manufacturing processes.

In one form, the optical head is generally composed of a light source, a turret containing various apertures for image generation, an optical arrangement required to project the image of the aperture onto the film and various filters for compensation.

In understanding the above optical head, it should be noted that the exposure of film is related to the integral of the spot intensity over the exposure time. In an artwork generator or photo-optical drafting machine, in order to obtain controlled line widths, the exposure on the film should be maintained constant as the size of a line is varied by the selection of different apertures. These apertures may be rectangular or circular in shape. An analysis of this approach, that is, of the selection of various apertures, in an environment where various relative velocities are employed, reveals that the exposure time of the film is a function of the velocity of the beam being traced over the film and the width of the beam (aperture) in the direction of movement (assuming constant illumination source intensity). Therefore, the slower the velocity or the wider the beam (aperture) along the path of motion, the greater the exposure of the film. Circular apertures tend to a certain extent to accentuate these variables. This is because with the circular aperture and spot, the integral along the path of motion through the center yields a high degree of exposure while the integral along the direction of motion at the outer periphery of the circular spot yields a very small exposure, that is, the width of the beam varies significantly in the direction of travel. The circular spot of light does have the significant advantage of being symmetric and therefore it is independent of the direction of relative motion giving the same results regardless of its direction. Thus, to generate quality visual representations (e.g., lines), the relative motion (e.g., velocity) and the aperture width and configuration (e.g., circle, square) are significant.

In order to control the above factors, the prior art has typically resorted to various optical devices. For example, the aforementioned U.S. Pat. No. 3,330,182 employs a different neutral density filter with each aperture to provide a compensation for the aperture configuration and employs a variable density optical filter driven by a velocity signal to tend to compensate for different velocity commands. Typically, such variable density filters are complex, high in cost and do not compensate for actual instantaneous velocities. In addition, because of their nature as being opto-mechanical devices, there is considerable time lag in reaction and is difficult to obtain uniformity over any substantial area. This type of optical control has been clearly preferred by the prior art. On the other hand, controlling the illumination source intensity has been considered undesirable and, where at all suggested by the prior art, has been discussed in a totally impractical and unworkable manner. Perhaps, one of the reasons that the prior art has not adapted an illumination source control approach is that such sources in general have been considered to involve too many variables for precise control. For example, the sources vary from one source to another source and each source has a particular dynamic characteristic and reaction within itself may be non-linear. In addition, these characteristics change during the lifetime of the source. Also, intensity changes create a difference in the spectrum of the emitted light which spectrum, depending upon its mixture, exposes the film to varying degrees. Thus, the prior art has attempted to treat the illumination source as a constant and has through it an undesirable element for the purposes of controlling exposure. The present invention goes contrary to these prior art teachings and eliminates substantially all optical filters and controls exposure by controlling illumination source intensity.

SUMMARY OF THE INVENTION

Briefly, the preferred embodiment of this invention comprises command means for commanding the intensity of an illumination source dependent in part upon the relative motion and image configuration, an illumination source for generating illumination in proportion to the command signal, a detection means for detecting a parameter related to the resulting illumination from the illumination source and for providing a signal proportional thereto and a comparing means for comparing the signal from the detection means with that from the command means to provide an error signal to energize the illumination source. The preferred embodiment has the advantages of being essentially independent of all mechanical elements for illumination control purposes, that is, the proper exposure of the illumination sensitive medium is obtained by electronic control and compensation. This enables maximum flexibility, speed, accuracy and economic fabrication. In addition, incident to the control of the exposure, the output of the illumination source is linearized and compensated for non-linearity, color temperature, aging and other error mechanisms. These and other advantages will be understood with greater specificity from the detailed description which follows.

Control of illumination that is projected on an illumination sensitive medium has broad applicability with visible light as in the preferred embodiment, but also applies to non-visible electromagnetic energy and generalized illumination systems including electron beam illumination as in a welding machine. The illumination sensitive medium may be a photo-chemical medium with either temporary persistancy or permanent affects, a medium that may be selectively modified or deteriorated such as weldable metal, or a medium otherwise affected by illumination.

Other forms of illumination control and processing, such as with an image rotation device, significantly improve the response of the illumination sensitive medium.

The drawing shows a preferred embodiment of the invention and such embodiment will be described but it will be understood that various changes may be made from the constructions disclosed and the drawings and description are not to be construed as defining or limiting the scope of the invention, the claims forming a part of this specification being relied upon for that purpose.

BRIEF DESCRIPTION OF THE DRAWING

FIG. 1 is a simplified system diagram of the invention.

DETAILED DESCRIPTION OF THE INVENTION

Referring to FIG. 1, the preferred embodiment of the system illustrated generally comprises an illumination processing means 10 for processing the illumination and forming an image on a recording medium 12 supported by machine positioning table 14. Machine positioning table 14 and illumination processing means 10 have controlled relative motion imparted therebetween by machine servo means 30. An illumination source means 48 is coupled to the illumination processing means 10 to provide illumination to said illumination processing means 10 to form a desired image on the recording medium. The illumination source means 48 is in turn energized and controlled by adaptive illumination control 50. Generally, adaptive illumination control 50 energizes illumination source 48 and controls the amount of such energization to obtain a desired source intensity in accordance with a command signal supplied thereto by command or computer processor means 80. The computer processor 80 is coupled to adaptive illumination control 50 to provide a command signal thereto and also coupled to servo 30 to provide a command signal thereto. The command to adaptive control 50 is related to the characteristics of the image to be formed by illumination processing means 10 on the recording medium 12. In addition, the servo means 30 provides an electrical signal to the adaptive control 50 which signal is related to the relative motion between the illumination processing means 10 and the table 14. Thus, illumination source 48 is energized by the adaptive control 50 in response to signals relating both to the relative motion and to the characteristics of the image being formed. The above generalized description will now be described in greater detail in the paragraphs which follow.

In a typical system, the machine positioning table 14 takes the form of an X-Y table wherein the positioning table is moved in a selected direction as the resulting movement of being mounted on X and Y drives. In such an arrangement, the head or illumination processing means 10 may be maintained in a fixed position and only the positioning table is moved or alternatively, the head is moved along one axis and the table is moved along the other axis. Various forms of such tables are currently manufactured by California Computer Products, Dainippon Screen Mfg. Co., Ltd., Gerber Scientific Company and a host of other manufacturers and generally shown in such patents as U.S. Pat. Nos. 3,464,330 and 3,330,182. These systems may be driven by stepping motors or continuous type DC control motors or AC servomotor aggregately referred to herein as servo motors. Such a motor is shown as table drive motor 16 which is indicated as driving the positioning table 14 in a left and right direction. The motor 16 is in turn controlled by servo system 18 which may take numerous forms as is well known in the prior art such as shown in U.S. Patent Nos. 3,258,667; 3,069,608; copending application Control Apparatus, Ser. No. 135,040 filed on Apr. 19, 1971, by Gilbert P. Hyatt and "Electro-mechanical Components for Servo-Mechanisms" by Davis and Ledgewood, McGraw Hill Book Company (1961 incorporated herein by reference). It is understood that a motor and control system therefor is provided for each axis. Image translation means other than an X-Y table can be used such as deflection with prisms, mirrors, and electro-optical devices; and other generalized translation means for translating the illumination image with respect to the illumination sensitive medium. The servo system 18 which is connected by line 19 to drive the motor 16 may typically receive a command signal from any of numerous means such as a tape reader, card reader or other input means. In the preferred embodiment, a command signal is provided by an input storage means via computer processor means 80 which command signal is representative of the desired relative motion between illumination processing means 10 and machine positioning table 14. In the application of the system to automatic drafting, the command signal supplied by computer processor 80 to servo-system 18 is representative of the particular object or circuit or other visual or other graphic display to be recorded on medium 12. Typically, this signal will be representative of an X coordinate in one instance and a second servo system (not shown) will receive a signal representative of the Y coordinate. The two servo systems will independently drive different members in an X and Y direction to give the resulting desired relative motion. This relative motion along each axis is transduced by a sensor 20 which senses the motion of the table in one direction and provides a signal representative of this motion. Such sensors are discussed in aforementioned references. The signal from sensor 20 is in turn supplied via line 22 to servo system 18 wherein this position (or velocity or both) signal is compared with the command signal supplied to the servo system. An error signal is generated as a result of the comparison and this in turn results in an energizing signal being supplied to the motor 16 which corrects the motion of the table 14 accordingly.

Another important function of the servo system 18 in the invented system is the providing of a signal related to the relative motion of table 14 and illumination means 10 to the adaptive control 50. Parameters that are related to the response of the illumination sensitive medium to the image may be used to adaptively control illumination, such as velocity in the preferred embodiment and illumination reflection, image color temperature and other such parameters in other embodiments. In a preferred form of the invention, the signal supplied by servo system 18 is a position error signal which may be in an analog form. The relative motion signal 24 from servo system 18 is a position error signal along one axis (e.g., the X-axis) and another servo system (not shown) provides a second position error signal along the Y-axis. Both of these signals are supplied to an analog computational network, which obtains the square root of the sum of the squares of these two signals and supplies a resultant analog velocity signal to the digital to analog converter to be multiplied by the digital image characteristic signal. The analog computational network may take any of numerous forms such as diode square law function generators with diodes in the input for squaring and in the feedback for generating the square root. It should be noted that the computational analog network for obtaining this signal is not specifically shown in FIG. 1 but is indicated within the servo system block 18 and servo system 18 is shown as supplying this signal to adaptive control 50 via line 24.

It is, of course, within the scope of the invention to have the relative motion signal obtained by digital techniques and in such cases, signals from the servo system 24 would be supplied to computer processor 80 wherein the square root computation would take place and the resultant motion signal would be supplied to adaptive control 50 via line 26. In such digital arrangements, the resultant motion signal would be digitally multiplied by the image characteristic signal prior to computer processor 80 supplying the signal to digital to analog converter 29. It should be understood that alternatively, the relative motion signal 24 may be a velocity signal.

The multiplication of the resultant motion signal and the image characteristic signal in the embodiment shown is performed in adaptive control 50 by a digital to analog converter 29 included therein. It is a well known technique to employ a digital-analog converter to both convert a digital signal (i.e., image characteristic signal) to the analog format and to simultaneously multiply that signal by another analog signal (i.e., resultant motion signal) which is the particular specific implementation shown in FIG. 1.

The computer processor means 80 may take the form of a small general purpose computer such as that marketed by Digital Equipment Corporation designated the PDP-11 or a dedicated computer system such as marketed by Micro Computer, Inc. under the trademark Contourama IV. In general, such systems employ a memory means 82 and a computer or central processing unit 84. It is, of course, understood that either or both memory means 82 and computer means 84 may include shift registers and other forms of temporary storage. Processor 80 also includes input storage means 2 which may be a tape reader, card reader, drum, disc or other input storage device. The input storage means is coupled to computer 84 for supplying information thereto under control of the program stored in memory means 82. Memory means 82 may include some form of programmable memory such as a core memory and may also include a form of read only memory. Such memory devices are well known in the art and commonly employed in programmable systems. A preferred embodiment is described in co-pending patent application, Factored Data Processing System for Dedicated Applications.

In a specific application, the specific image to be formed on recording medium 12 would be first transferred from some source material to a tape (e.g., paper or magnetic) by an appropriate digitizing step. The tape input would then be processed by computer 84 and memory 82. As part of the digitizing, to form a particular image, such as a selected line, the operator would select a particular slide or aperture available in illumination processing means 10. The slide selection input from the input source means 2 would typically result in computer means 84 (via various logic circuits) providing a control signal on line 28 which would operate illumination processing means 10 to select a particular aperture therein. During this aperture selection, the illumination processing means 10 would be ineffective to expose recording medium 12. During this down period of the illumination processing means 10, either there could be no relative movement between illumination processing means 10 and recording medium 12 or there could be relative motion resulting in a repositioning but not a writing on the medium.

Substantially simultaneously with the selection of an aperture and illumination processing means 10, computer 84 as a result of aperture selection input accesses memory means 82 and a table stored therein which table includes a stored characteristic signal for each aperture of illumination processing means 10. This aperture characteristic signal is transferred to adaptive control 50 and functions as a command signal or part of a command signal to be employed in adaptive illumination control means 50. In the embodiment shown in FIG. 1, the command signal provided on line 26 by computer 84 is combined or modified by the relative motion signal and more specifically by the resultant velocity or acceleration signal from servo system 18 to form the command signal that controls the energization of illumination source 48. In the specific embodiment shown, the digital command signal suppled by computer 84 via line 26 is supplied to a digital to analog converter 29 which converts the digital signal to an analog signal of a suitable form to control the illumination source 48. As previously mentioned, the converter 29 is of a well known type wherein a second signal in the form of an analog signal may be supplied to converter 29 for simultaneous multiplication of the digital signal thereby. In the embodiment shown in FIG. 1, the analog resultant velocity signal is supplied on line 24. Thus, the command signal from digital-analog converter 29 is related to both the relative motion (e.g., resultant velocity) and the image (e.g., aperture) to be formed by illumination processing means 10. This composite command signal is supplied to the adaptive illumination control means 50 for controlling energization of illumination source 48.

Adaptive illumination control means 50 comprises a compensation means 51 which includes a pair of compensation networks 52 and 53 which, in general, are RC networks, LC networks and combinations thereof for obtaining stabilization, compensation and gain (e.g., static and dynamic) in accordance with well known servo and feedback techniques such as described in "Servo Mechanism Practice" by Ahrendt and Savant, McGraw Hill (1960); and "Basic Feedback Control System Design" by Savant, McGraw Hill (1958). Compensation network 52 couples the command signal to comparing means 54. The compensation network 53 functions to couple a feedback signal from the output of power amplifier 60 to comparing means 54 and thus contributes to providing the desired stabilization, compensation, matching and gain characteristics of illumination from the source 48 as the illumination varies with an independent variable which is the compensation command signal on line 55. In addition, a specific system as shown in FIG. 1 may employ compensation means 51 to match the characteristics of illumination source 48 to the characteristics of the servo system 18 (including the machine positioning table 14). It is to be understood that illumination source 48 has certain dynamic and static characteristics, that is, upon being energized, it has a response characteristic and similarly when de-energized, it has a response characteristic. These characteristics of the illumination source 48 in a high performance system must be precisely matched to the dynamic and static response of servo system 18 including the positioning table which has particular acceleration and deceleration characteristics. In certain systems, a compensation network will also be included in the servo system 18 and both networks will contribute to the matching of the illumination system and the positioning system. For example, it may be necessary to decrease the rate of velocity change in order to permit matched decrease of the illumination intensity. Specifically, in order to draw a well controlled precisely defined line, it is necessary that as the machine positioning table 14 experiences acceleration and deceleration that the intensity of the illumination be increased and decreased in a related way. In order to accomplish this in the instant system, rather than holding the illumination provided by illumination source 48 constant, the instant system varies the illumination but in doing so the dynamics of the illumination source is matched to the dynamics of the positioning table and servo system by compensation means 51.

The signal from compensation network 52 is supplied to comparing means 54 via line 55. The comparing means 54 is typically a differential amplifier which may be configured from a commercially available operational amplifier such as that sold and commonly referred to as the 709 or 741 integrated circuit operational amplifier. In addition to the compensated command signal received from compensation network 52, the comparing means 54 receives a plurality of other signals. Foremost among these signals is the adaptive feedback signal supplied by detection means 56 which is coupled to illumination source 48 to sense a characteristic of the illumination supplied by illumination means 48 which is at least related to the intensity of such illumination. Typically illumination such as an electron beam, the light or electromagnetic radiation emitted may be directly sensed or may be indirectly sensed such as by sensing the temperature. In the embodiment shown in FIG. 1, a photocell (such as a silicon photocell or arrays thereof) is placed adjacent to illumination source 48 and supplies a signal proportional to the emitted radiation in the selected spectrum to comparing means 54 via line 57. The photocell may be positioned at numerous positions in the space between the source 48 and medium 12.

The comparing means 54 compares the emitted intensity with the commanded intensity as represented by the signal supplied on lines 57 and 55, respectively, and provides an error signal on line 58 proportional to the differences between these signals. The error signal on line 58 is supplied to control power amplifier 60 which in turn amplifies the error signal to energize illumination source 48.

From the above, it can be seen that illumination source 48 is energized in accordance with the image to be projected and the relative motion between the illumination processing means and the recording medium while the illumination source characteristics are matched to the characteristics of the system for creating relative motion. In addition, this is all accomplished while the output of the source which may ordinarily vary from source to source and which varies over the life of the particular source as well as varying with other circumstances, is continually monitored and the resulting energization is adjusted in accordance with such performance of the source.

The preferred embodiment of this invention has specific command and control means. Other command and control means will become obvious to those knowledgeable in the art for other illumination control applications. For example, in an electron beam welding machine, sensing the electron flux, the beam reflection, the weld temperature and other illumination characteristics can be interrelated and used to control various characteristics of the electron beam illumination.

The other signals supplied to comparing means 54 should be briefly considered. The other signals supplied to comparing means 54 are a biasing signal supplied by bias means 62 and a pulse signal supplied by pulse means 64. These signals are supplied to comparing means 54 by line 66 which is shown as a single line but, of course, may be two independent connections to comparing means 54. The bias means 62 is an electrical power supply which provides a bias voltage of a sufficient level to maintain the lamp at the threshhold of illumination. The maintaining of the illumination source at the threshhold increases the speed of the illumination source in going from an off to an on state, that is, it improves turn-on dynamics.

The illumination source may be an incandescent lamp in a photo-optical machine embodiment; but may be other visible sources such as a gas lamp or solid state lamp (i.e., electro-luminescent panel or light emitting diode) or may be other than a visible radiant energy source such as an electron beam source as in a welding machine.

The pulse means 64 provides a pulse of current for rapid illumination source turn on. It is common to many types of sources such as incandescent lamps to require a surge of current for turn on. The pulse means 64 provides this surge of current for such lamps. It should be understood that while bias means 62 and pulse means 64 are shown as coupled to comparing means 54, it is within the scope of the invention to couple such devices into other circuits in the adaptive illumination control means for obtaining the same function. It is also within the scope of the invention to provide additional bias means or pulse means to accomplish other specialized functions such as static exposures and very low velocity exposures. In such situations, it may be more appropriate to couple such biasing means or pulse means into the digital-to-analog converter in order that it may be modified by various factors provided by the computer processing means 80.

Illumination processing means 10 operates to process illumination from illumination source 48 to the recording medium 12 to form a selected image illuminated by illumination source 48 onto said recording means 12 and to provide a plurality of selectable images that may be formed on said recording means 12. The function of the processing of the illumination and the forming of the image is performed by well known components which typically may take the form of lenses, shutters and fiber-optic elements. As shown in the embodiment of FIG. 1, this function is performed by lense 68, shutter 69 and objective lense pair 70 and 71. Such optical arrangements are well-known in the art as shown in U.S. Pat. No. 3,330,182.

The illumination processing means may also include electro-optic devices (i.e., devices that change their optical characteristics upon electrical stimulus); filters of various density, color and orientational characteristics; masks; shutters; prisms and other such devices that processes radiant energy. Illumination other than visible radiant energy can also be processed with devices that perform similar functions such as illumination concentrating, masking, focusing, collimating, deflecting and other such functions.

The selection of images is accomplished by an aperture wheel or slide 72 containing a plurality of apertures 73 of various configurations and sizes which aperture wheel is rotated by an aperture wheel motor 75 which in turn is controlled by computer means 84 via line 28. As a result of the signal supplied by input storage means 2, the computer means 84 provides a signal along line 28 which controls motor 75 to move aperture wheel 72 to a particular position wherein a specific aperture is placed in the illumination path and the lens system forms an image of the particular aperture on the recording medium 12.

It has been found that while circular apertures have the distinct advantage of being symmetrical and are completely unaffected by the direction of relative motion, such apertures have a disadvantage when compared to a square aperture. The rectangular aperture has the distinct comparative advantage of having a constant width in a particular direction of relative motion. This constant width results in a more precise exposure of the recording medium 12. The rectangular aperture, however, has a disadvantage of being non-symmetrical and affected by the particular path of relative motion. The present system in one form takes advantage of the desirable characteristic of rectangular apertures and eliminates the disadvantage of such apertures. In general, this is accomplished by rotating the aperture mechanically or rotating the image of the aperture optically as a function of the instantaneous slope of the line being traced so that the aperture is always oriented with its axis parallel to the axis of relative movement. Thus, the axis of the aperture is aligned with the path of travel or in some instances, such as in circular movement, tangent thereto. In order to accomplish this alignment as shown in FIG. 1, computer 84 provides a command signal via line 90 to servo system 92 which in turn provides a control signal via line 94 to motor 96 which in turn rotates the illumination processing means 10. It should be remembered that the computer 84 also provides the command signals which command the relative motion of the illumination processing means and positioning table and therefore it may expeditiously provide the command signals to control the axis alignment of the aperture. The precise position of illumination processing means 10 is sensed by transducer 98 which provides a signal on line 100 representative of the position of illumination processing means 10 and specifically of the aperture (i.e., axis of the aperture) employed therein. The servo system 92 compares the signal supplied via line 100 with the command signal supplied by computer 84 via line 90 and provides the error signal on line 94 to drive motor 96. As previously mentioned, suitable servo systems are well known in the art and numerous different types may be employed consistent with this invention. It should, of course, be appreciated that the aperture slide 73 may be directly rotated to accomplish the same function or alternatively prisms, electro-optical devices or other illumination processing optical devices may be employed to rotate the image of the aperture to accomplish the same function of aligning the axis of the aperture with the direction of path travel.

In summary, the general operational aspects of the preferred embodiment control system will now be considered. First, the particular part program is supplied to computer 84 by input storage means 2. The part program includes information necessary for the computer in cooperation with memory means 82 to provide command signals to servo system 18, servo system 92, aperture wheel motor 75, and adaptive illumination control means 50. The command signal to servo system 18 creates the relative movement between optical means 10 and machine positioning table 14 which supports recording medium 12, while the control signal to aperture wheel motor 75 selects a particular aperture to be imaged on the recording medium by illumination processing means 10 during the controlled relative motion. Simultaneously, a command signal from computer 84, a preset aperture control signal from the computer and a signal from the servo system 10 (processed to obtain the resultant velocity) are provided to adaptive illumination control means 50 to control the intensity of illumination source 48. This control is achieved by the detection means 56 continuously monitoring the output of the illumination source 48 and providing a feedback signal from which comparing means 54 generates an error signal that maintains the commanded intensity. In the case where a non-symmetrical aperture is selected such as a rectangular aperture, the computer 84 also provides a command signal to servo system 92 which controls the orientation of the aperture so that its axis is aligned with the path of travel to assure constant exposure of the recording medium.

From the above description, it should be clear that numerous advantages are achieved by the disclosed system. Namely, an illumination control system is provided for obtaining the precise exposure of a recording medium over the life of the equipment. This can be achieved in the preferred embodiment without the use of any filters or mechanical devices. The system includes means whereby an illumination system as it ages and changes is continually adjusted for such lifetime and environmental changes. In addition, the system has extreme flexibility whereby precise illumination control may be achieved and the intensity may be altered by altering the information supplied by input storage means and the program stored in memory means 82. Further, the system includes devices whereby a non-symmetrical aperture may perform with all of the advantages of a circle aperture as well as that of a non-symmetrical aperture. These are but a few of the many advantages achieved by the disclosed system. Other advantages would be apparent to one of ordinary skill from the disclosure above.

We claim:

1. A system for selectively exposing an illumination sensitive medium with controlled illumination, said system comprising;

closed loop illumination control means for controlling illumination including a. illumination feedback means for generating an illumination feedback signal in response to the controlled illumination and b. means for generating an electrical energization signal in response to the illumination feedback signal;

illumination source means for generating the controlled illumination in response to the electrical energization signal;

closed loop motion control means for controlling relative motion between the illumination and an illumination sensitive medium including a. motion feedback means for generating a motion feedback signal in response to the relative motion and b. means for generating a motion control signal in response to the motion feedback signal; and a machine for providing relative motion between the illumination and an illumination sensitive medium in response to the motion control signal.

2. A system for selectively exposing an illumination sensitive medium with controlled illumination, said system comprising:

illumination command means for generating an illumination command signal, said illumination command signal being related to a desired illumination;

illumination feedback means for generating an illumination feedback signal in response to a particular spectrum of the controlled illumination;

illumination control means for generating an illumination control signal in response to the illumination command signal and the illumination feedback signal;

illumination source means for providing the controlled illumination in response to the illumination control signal;

a closed loop servo for controlling motion between the illumination and an illumination sensitive medium including motion feedback means for generating a motion feedback signal in response to the motion and means for generating a motion control signal in response to the motion feedback signal; and machine means for providing relative motion between the illumination and said illumination sensitive medium in response to the motion control signal.

3. A system for providing selective exposures, said system comprising:

illumination means for providing controlled illumination in response to an illumination control signal;

an illumination sensitive medium for providing exposures in response to the controlled illumination;

illumination command means for generating an illumination command signal being related to a desired illumination;

illumination feedback means for generating an illumination feedback signal in response to the controlled illumination;

illumination control means for generating the illumination control signal in response to the illumination feedback signal to reduce a difference therebetween;

motion command means for generating a motion command signal related to a desired relative motion between the illumination and said medium;

motion control means for generating a motion control signal including motion feedback means for generating a motion feedback signal being related to actual motion and comparing means for generating the motion control signal in response to the motion command signal and the motion feedback signal, said motion control means being arranged as a closed loop servo; and a machine for providing relative motion between the illumination and said medium in response to the motion control signal.

4. The system as set forth in claim 3 above further comprising means for generating a velocity feedback signal in response to the relative motion, said illumination command means being further responsive to the velocity feedback signal for generating the illumination command signal.

5. The system as set forth in claim 3 above wherein said illumination feedback means includes spectrum selection means for providing the illumination feedback signal in response to a selected spectrum portion of said controlled illumination.

6. An illumination control system for selectively exposing an illumination sensitive medium with controlled illumination, said system comprising:

means for generating a first command signal;

means for generating a second command signal;

illumination control means for generating a control signal in response to the first command signal and the second command signal, wherein said control signal is related to the product of the first command signal and the second command signal;

illumination means for generating controlled illumination in response to the control signal;

an illumination sensitive medium for generating exposures in response to the controlled illumination; and a machine for providing relative motion between said medium and the controlled illumination.

7. The system as set forth in claim 6 above wherein the first command signal is a digital command signal, the second command signal is an analog command signal, and the control signal is an analog control signal; said control signal generating means including multiplication means for generating the analog control signal in response to the digital command signal and the analog command signal.

8. The system as set forth in claim 6 above wherein said first command signal generating means includes motion feedback means for generating the first command signal in response to the relative motion and wherein said second command signal generating means includes stored program computer means for generating the second command signal in response to a stored program.

9. The system as set forth in claim 6 above further comprising illumination feedback means for generating a feedback signal in response to the controlled illumination, said control signal generating means including comparing means for generating the control signal in response to a difference between the feedback signal and the product of the first command signal and the second command signal.

10. An illumination control system comprising:

illumination means for providing illumination in response to an illumination control signal;

illumination feedback means for generating an illumination feedback signal in response to the illumination;

illumination control means for generating the illumination control signal in response to the illumination feedback signal;

an illumination sensitive medium for providing exposures in response to the illumination;

machine means for providing relative motion between the illumination and said medium in response to a motion control signal;

motion control means for controlling the relative motion in response to a motion command signal, said motion control means including a closed loop servo for generating the motion control signal in response to the motion command signal and a motion feedback signal and including motion feedback means for generating the motion feedback signal in response to the relative motion;

motion command means for generating the motion command signal; and compensation means for matching the dynamic response of the illumination control signal and the dynamic response of the motion control signal.

11. An illumination control system comprising:

illumination means for providing controlled illumination in response to an electrical control signal;

an illumination sensitive medium for generating exposures in response to the controlled illumination;

illumination feedback means for generating an illumination feedback signal in response to said controlled illumination;

electrical means for controlling said illumination, said electrical means including closed loop means for providing the electrical control signal in response to the illumination feedback signal; and a machine for providing relative motion between said medium and said controlled illumination.

12. The system as set forth in claim 11 above further comprising motion control means for controlling the relative motion and motion feedback means for generating a motion feedback signal, said motion feedback signal being related to the relative motion, said electrical means being further responsive to the motion feedback signal for providing the electrical control signal.

13. The system as set forth in claim 11 above further comprising illumination command means for generating an illumination command signal, said illumination command signal being related to a desired exposure of said illumination sensitive medium, said electrical means being further responsive to the illumination command signal for providing the electrical control signal.

* * * * *